United States Patent [19]

Symes et al.

[11] Patent Number: 4,664,239
[45] Date of Patent: May 12, 1987

[54] SYSTEM FOR DISABLING, ENABLING AND OTHERWISE CONTROLLING VEHICLE FUNCTIONS BASED UPON CONTINUOUS MEASUREMENT OF CLUTCH WEAR AND CLUTCH POSITION

[75] Inventors: Randall A. Symes; Richard J. Zablocki, both of West Allis, Wis.

[73] Assignee: Applied Power Inc., Milwaukee, Wis.

[21] Appl. No.: 763,633

[22] Filed: Aug. 8, 1985

[51] Int. Cl.⁴ ............................................. B60K 41/02
[52] U.S. Cl. ............................. 192/0.084; 192/30 W; 192/111 A; 192/0.096; 340/686; 188/1.11
[58] Field of Search ............ 192/30 W, 111 A, 70.25, 192/0.084, 0.096, 0.03; 188/1 A; 340/686, 870.38; 91/1

[56] References Cited

U.S. PATENT DOCUMENTS

| 3,307,667 | 3/1967 | Maurice . | |
|---|---|---|---|
| 3,339,676 | 9/1967 | Quinn | 188/1.11 |
| 3,406,800 | 10/1968 | Buchanan et al. | 192/111 R X |
| 3,412,391 | 11/1968 | Ward . | |
| 3,720,118 | 3/1973 | McCormick . | |
| 3,726,191 | 4/1973 | Johnston et al. . | |
| 3,752,282 | 8/1973 | Epenshied . | |
| 3,887,040 | 6/1975 | Simon et al. | 188/1.11 |
| 4,267,697 | 5/1981 | Hodkinson . | |
| 4,381,507 | 4/1983 | Parmer | 340/870.38 |
| 4,386,552 | 6/1983 | Foxwell . | |
| 4,567,972 | 2/1986 | Buch et al. | 192/30 W |

FOREIGN PATENT DOCUMENTS 1382342  11/1964  France .

Primary Examiner—George H. Krizmanich
Attorney, Agent, or Firm—John C. Cooper, III; Fred Wiviott

[57] ABSTRACT

A hydraulic master-slave system for clutch actuation includes a clutch sensor system to continuously detect and measure clutch position and wear. One alternate preferred embodiment comprises a resistive strip and wiper assembly coupled to an electrical control circuit to control vehicle functions dependent upon clutch position and wear. A second alternate preferred embodiment employs an optical fence and optical interrupter designed to generate quadrature output to the electrical control circuit.

21 Claims, 8 Drawing Figures

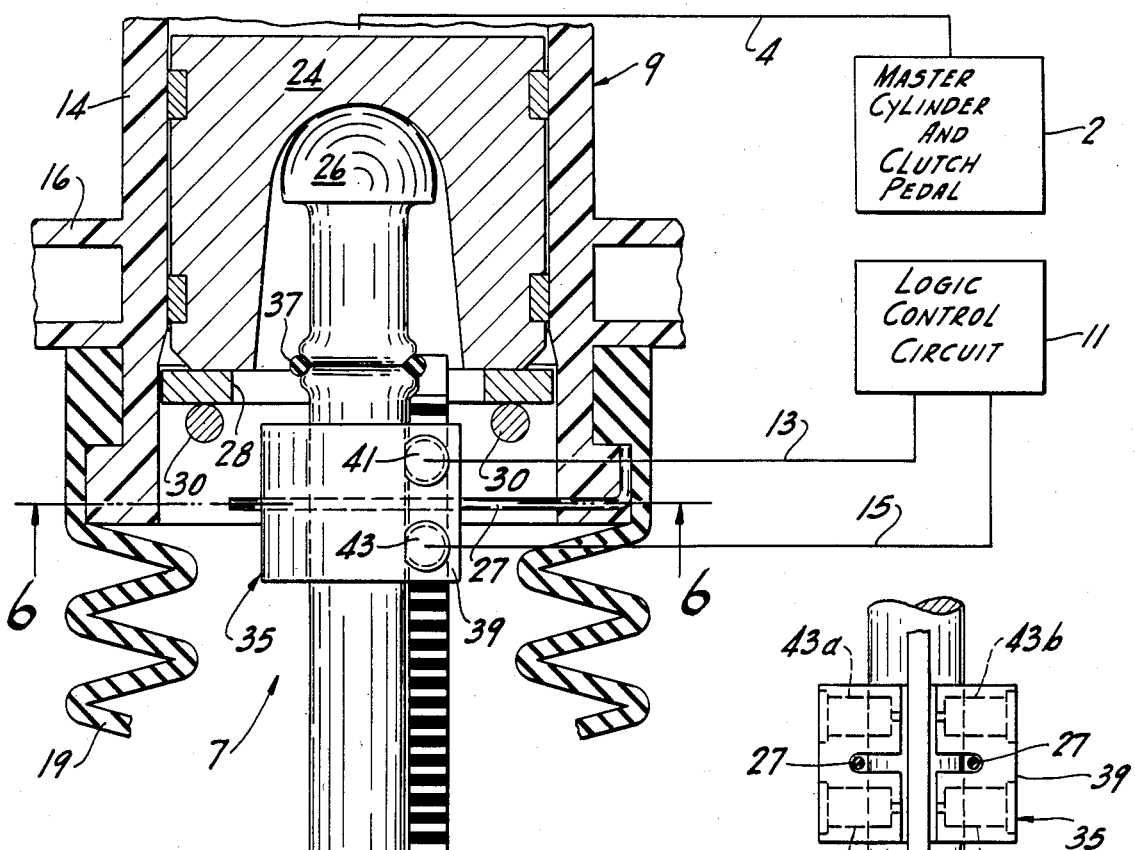
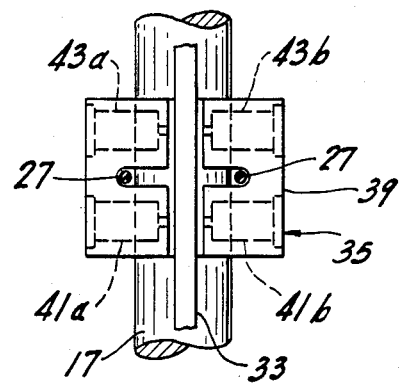
Fig. 7
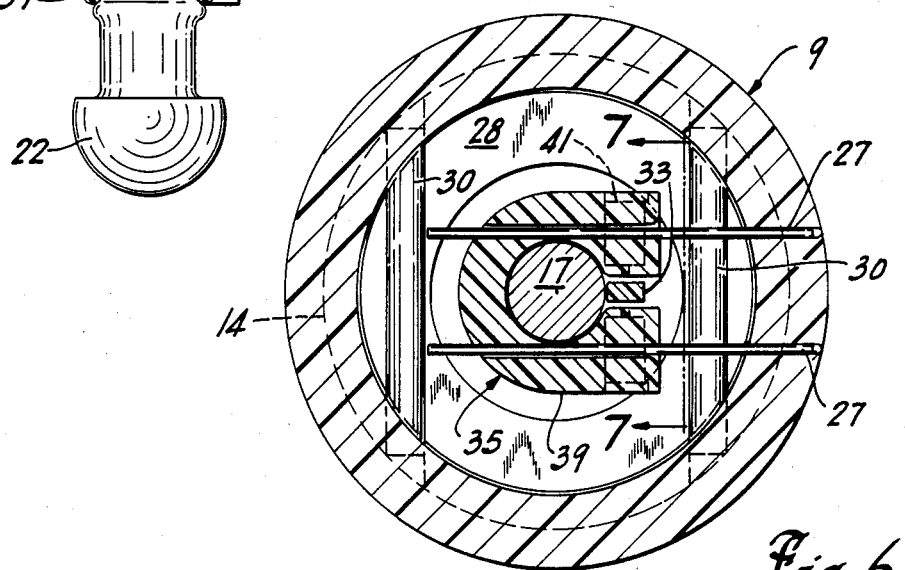
Fig. 6
Fig. 5

SYSTEM FOR DISABLING, ENABLING AND OTHERWISE CONTROLLING VEHICLE FUNCTIONS BASED UPON CONTINUOUS MEASUREMENT OF CLUTCH WEAR AND CLUTCH POSITION

BACKGROUND OF THE INVENTION

1. Field of the Invention

The present invention relates generally to the art of vehicle clutch systems, and more particularly to clutch systems employing both a master cylinder and a slave cylinder. Still more specifically, the present invention relates to a hydraulic master-slave clutch system which also includes a slave cylinder sensor that generates electrical signals that can be used to control a number of the vehicle's functions that are dependent upon clutch position and wear.

2. Description of the Prior Art

It is well known in the motor vehicle art that a hydraulic cylinder can be employed for clutch release. It is also known to employ a master hydraulic cylinder coupled respectively to the vehicle clutch pedal and to a slave hydraulic cylinder. The slave cylinder in turn is coupled to the throw-out bearing of the vehicle clutch.

A typical hydraulic clutch is shown in Hodkinson's U.S. Pat. No. 4,267,697 issued May 10, 1981 for "Hydraulic Master Cylinder." Illustrative master-slave cylinder combinations for clutch actuation are shown in the following U.S. patents: Maurice, U.S. Pat. No. 3,307,667, issued Mar. 7, 1967 for "Declutching Device for Obviating Wear Adjustment". Buchanan, et al., U.S. Pat. No. 3,406,800 issued Oct. 22, 1968, for "Hydraulic Clutch Wear Warning Device"; and Espenschied, U.S. Pat. No. 3,752,282 issued Aug. 14, 1923, for "Clutch with Plural Fluid Releasing Means." In each of the latter three patents a master cylinder is located in the vicinity of the clutch pedal and is actuated by a push rod connected thereto. Hydraulic tubing connects the master cylinder to a slave cylinder located in the vicinity of the clutch. The slave cylinder is connected to the clutch mechanism, e.g., by a rod extending from the slave cylinder. The combination of a master and a slave cylinder for clutch release has proven to be advantageous because it permits greater flexibility in vehicle design, and combination systems are now employed in a number of commercial vehicles.

Such use of two cylinders increases the number of components which can malfunction. In co-pending, commonly assigned patent application Ser. No. 710,593 filed Mar. 11, 1985, a master-slave clutch system is described. The system of the aforementioned application includes an improvement over the other prior references described above in that a system is included for preventing ignition of the vehicle unless positive actuation of the slave cylinder has occurred to release the clutch plate. The systems described in the application include Hall effect sensors, hydraulic fluid pressure sensors, bar code readers, etc. The application describes systems in which the sensors may be located in either or both of the master and slave cylinders, it being preferred to always include such a sensor in the slave cylinder.

The co-pending application describes circuitry connected to the sensors which will prevent ignition of the motor vehicle unless a component of the slave cylinder has moved a predetermined distance. Using such a system, malfunctions of the master-slave cylinder system cannot lead to lurching of the vehicle in the event the clutch pedal is depressed but the clutch itself has not been released.

While the aforementioned co-pending application describes a system which represents a significant improvement over prior art master-slave systems, several problems are encountered utilizing same. First, as wear of the clutch plate increases, the spring forces acting upon the throw-out bearing of the clutch and coupled to the slave cylinder by suitable linkages, will cause a gradual shift of the position of the piston of the slave cylinder. As wear continues, the degree of such shift will increase. Even though the amount of wear is not sufficient to require repair of the vehicle, the movement of the piston of the slave cylinder may result in inaccurate sensing by certain of the systems described in the co-pending application. False signals may therefore result, even though many miles of additional driving may be possible without adjustment to or replacement of any clutch components.

Another problem inherent in most prior art master-slave cylinder combinations is that clutch wear, if it exceeds a certain amount, may be dangerous to the clutch components or even to the slave cylinder components if not promptly detected. One solution to this problem is suggested in the aforementioned Buchanan, et al., U.S. Pat. No. 3,406,800. In this patent, a biasing spring couples a linkage arm between the push rod of the slave cylinder and the throw-out bearing of the clutch and a pair of electrical contacts are provided inside the slave cylinder. A second biasing spring is interposed between the two contacts. This patent recognizes the movement of the slave cylinder piston as wear increases and arranges the internal components of the slave cylinder so that when the force of the first biasing spring is overcome (because of clutch wear), the electrical contacts will come into close proximity and finally contact one another to ignite a warning lamp on the vehicle dash. The lamp arrangement with the electrical contacts should be arranged so that the lamp will ignite prior to the time that damage has occurred because of wear to either the clutch or slave cylinder components. The prior art and co-pending application further suffer from the shortcoming of only performing either the function of checking clutch wear or of ensuring clutch release prior to ignition.

It would represent a significant advance in the art to provide a master-slave cylinder combination which overcomes the disadvantages of the prior art master-slave systems and which additionally overcomes the problems and shortcomings noted with regard to the co-pending application. More specifically, it would be advantageous to have a piston rod position sensor system designed for use with at least the slave cylinder so that movement of the slave cylinder piston due to clutch wear could be dealt with and compensated for by the system which senses whether sufficient movement of the slave cylinder push rod has occurred. Likewise, it would also be advantageous to use a system to control other vehicle systems that typically depend on piston position for enabling or disabling. Moreover, it would be advantageous to include in such system a method for determining on a continual basis the amount of clutch wear which has occurred and which would not depend upon any limit being reached. The latter feature would enable mechanics to evaluate the degree of clutch wear during any routine analysis of the vehicle and therefore conduct advanced evaluations of the timeliness of clutch repair needs.

It is well known in the hydraulic cylinder art that conductive and resistive elements may be used to determine the position of a piston within a cylinder. Typical of these systems is that disclosed in Johnston, et al., U.S. Pat. No. 3,726,191, issued Apr. 10, 1973 for "Electrically Controlled Hydraulic system and Transducer Therefore." Johnston illustrates a hydraulic cylinder of the kind used in construction or earth moving equipment. The voltage between a contact point on the piston and one end of the cylinder is compared to the voltage between the two ends of the cylinder. These voltages are measured on the same elongate piece of conductive material with a uniform unit resistance. By comparing the two measured voltages, an electrical control system determines the relative resistances and thus the position of the piston within the cylinder. A similar system is disclosed in McCormic's U.S. Pat. No. 3,720,118, issued Mar. 13, 1973 for "Integrated Servo Actuator." A conductive bimetal bar and brush assembly produce a feedback signal that is an electrical readout of the actuator's position. Other related devices incorporating conductive strips within the cylinder unit are shown in Buxton, et al., French Pat. No. 1,382,342, issued Nov. 9, 1963 for "Fluid Cylinder Positioning Systems," Ward's U.S. Pat. No. 3,412,391, issued Nov. 19, 1968 for "Pressure-Fluid-Operated Devices and Means for Indicating the Condition Thereof," and Foxwell's U.S. Pat. No. 4,386,552, issued June 7, 1983 for "Power Cylinder with Internally Mounted Position Indicator."

It is also known in the hydraulic cylinder art that optical systems may be used to determine the position of a piston within a cylinder.

An example of this type of system is the co-pending, commonly assigned application Ser. No. 710,593, cited above. One of the alternate embodiments of the invention disclosed in that application utilizes an optical bar code to determine the positions of the rods and pistons in both the master and slave cylinders.

OBJECTS AND SUMMARY OF THE INVENTION

It is a principal object of the present invention to provide a vehicle hydraulic master-slave clutch system which includes a sensor system capable of continuously providing signals to control functions that are dependent upon the piston rod position.

Another object of the present invention is to provide a hydraulic clutch actuation system that is safer and more reliable than prior art clutch actuation systems.

Yet another object of the present invention is to provide a clutch master-slave system in which the clutch actuation system is capable of auto-referencing, thus taking into account factors such as clutch wear.

Still another object of the present invention is to provide a master-slave cylinder clutch sensor system that will warn the vehicle operator of excessive clutch wear before such wear reaches a dangerous level.

A different object of the present invention is to provide a master-slave cylinder clutch sensor system capable of providing a broader scope of information than prior art systems have been capable of providing.

How these and other objects of the invention are accomplished will be described in the following detailed description of the preferred embodiments, taken in conjunction with the drawings. Generally, however, they are accomplished by providing a hydraulic master cylinder coupled to the vehicle clutch pedal, which responds to depressing of the pedal to deliver hydraulic fluid under pressure to a slave cylinder. The slave cylinder in turn is coupled to the vehicle's clutch, e.g., by a push rod. In the present invention, a sensing mechanism provides vehicle systems with data on slave cylinder piston rod position, taking into account the actual amount of clutch wear. Two different types of clutch sensing systems are disclosed. In one embodiment, a resistive strip and wiper assembly produce an output which is processed by an electrical control circuit. The circuit's output then controls various functions of the vehicle, such as starter enabling and clutch wear measurement. In the other embodiment, an optical fence and optical interrupter component generate signals similar to those generated by the resistive strip and wiper assembly of the other embodiment. These signals are processed by a control logic circuit. The logic circuit's output can be used to control vehicle functions.

While the following description of the preferred embodiments depict two ways of accomplishing the objects of the invention, the objects could also be accomplished using other types of sensors and control circuits which would become apparent to those skilled in the art after the present specification has been read and understood. Accordingly, the disclosed embodiments are to be taken as illustrative rather than limiting.

DESCRIPTION OF THE DRAWINGS

FIG. 5 is a perspective view (partially in section and with parts broken away) showing a second embodiment of the present invention in which an optical fence and two LED/Photocell encoder arrays are included in the slave cylinder piston position sensor;

FIG. 6 is a cross-sectional view of FIG. 5 taken along the line 6—6;

FIG. 7 is a top sectional view of the optical fence and encoder arrays taken along the line 7—7 of FIG. 6;

In FIGS. 1-8, like reference numerals are used to indicate like components.

DESCRIPTION OF THE PREFERRED EMBODIMENTS

Before proceeding to the description of the FIGURES, it should be understood at the outset that the present invention is readily adaptable to a wide variety of vehicles, such as automobiles, trucks, off-road vehicles, etc. In short, it can be employed with any vehicle which includes a clutch pedal to be depressed by the operator and a clutch assembly located remotely therefrom. Moreover, it should also be understood that the present invention can utilize a number of different kinds of master or slave cylinders. It is for this reason that some known or basic cylinder components are not shown in detail. Finally, it should be understood that the present invention may be employed with other clutch control systems already known.

In references to other clutch control systems, it is known that a manual transmission automobile can include a switch system for indicating when the shift lever is in the neutral position. This will allow the driver to start the car, whether or not the clutch pedal is depressed when the shift lever is in the neutral position. In recent years, this type of control has been combined with the clutch pedal activated mechanical switch system discussed earlier in this specification. Such a "neutral" override can be employed with the safety system of this present invention. It is also known that automobiles may be equipped with light, buzzer or even voice-simulation devices for advising the driver of component or system malfunction. The present invention could readily be adapted to give such a warning to the driver.

Figure 1:
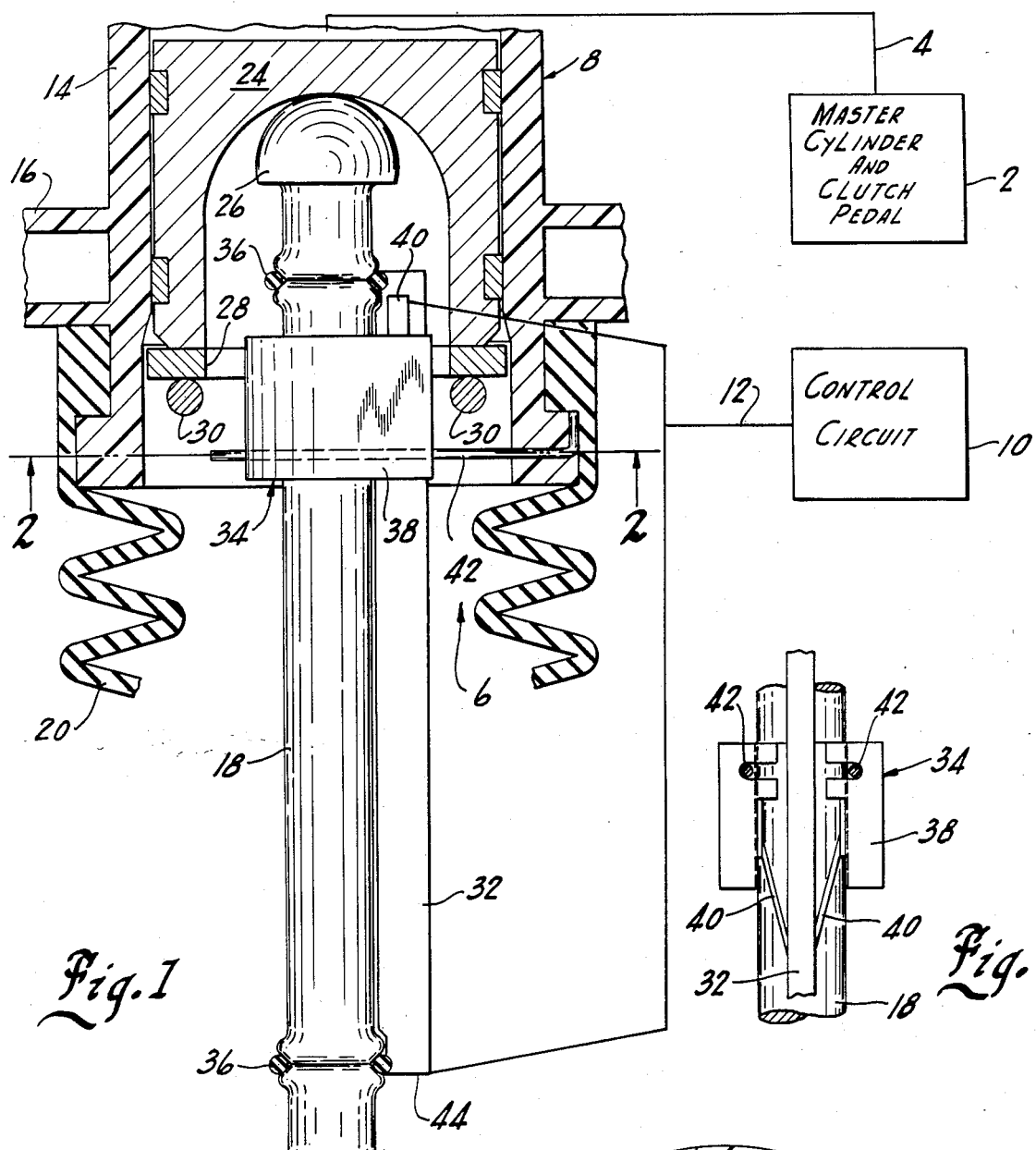
FIG. 1 is a perspective view (partially in section and with parts broken away) of a slave cylinder in a hydraulic clutch master-slave cylinder system according to one embodiment of the present invention, illustrating the use of a resistive strip on a piston rod in a fully extended position and a wiper assembly as the slave cylinder piston position sensor.

Proceeding now to a description of the drawings, one preferred embodiment of the present invention is depicted in FIG. 1 which illustrates a hydraulic master-slave cylinder clutch system. The master-cylinder and clutch pedal 2 are in hydraulic communication via conduit 4 with a slave cylinder piston rod position sensor system 6. The master-slave cylinder clutch system is of the type disclosed in the aforementioned co-pending application. Piston rod position sensor system 6 comprises a slave cylinder 8 and control circuit 10 connected by lead 12.

Slave cylinder 8 includes a generally cylindrical shell 14 having flange elements 16 extending therefrom to permit cylinder 8 to be secured to the vehicle. A push rod 18 enters cylinder 8 through a rubber boot 20, the outer end 22 of rod 18 being coupled to the vehicle clutch (not shown). Extension of rod 18 caused by depressing the clutch pedal will, in turn, cause release of the clutch.

A piston 24 is located adjacent the inner end 26 of rod 18 and will cause extension of the rod 18 when the clutch pedal is depressed. Piston 24 is prevented from over-extending rod 18 by washer 28 which is held in place by bolts 30.

The heart of the piston rod position sensor comprises a resistive strip 32 attached to rod 18 and a wiper assembly 34 through which rod 18 and resistive strip 32 pass. Wiper assembly 34 and resistive strip 32 generate a voltage signal that is transmitted via lead 12 to control circuit 10.

Figure 3:
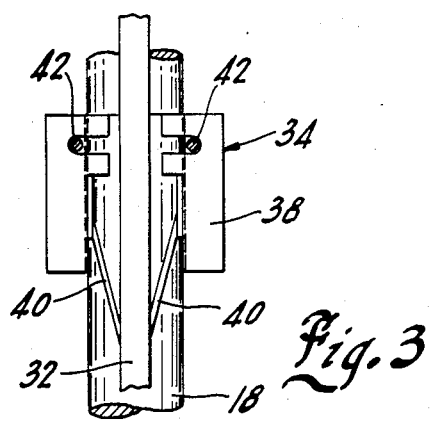
FIG. 3 is a top sectional view of the wiper assembly and resistive strip taken along the line 3—3 of FIG. 2.
Figure 2:
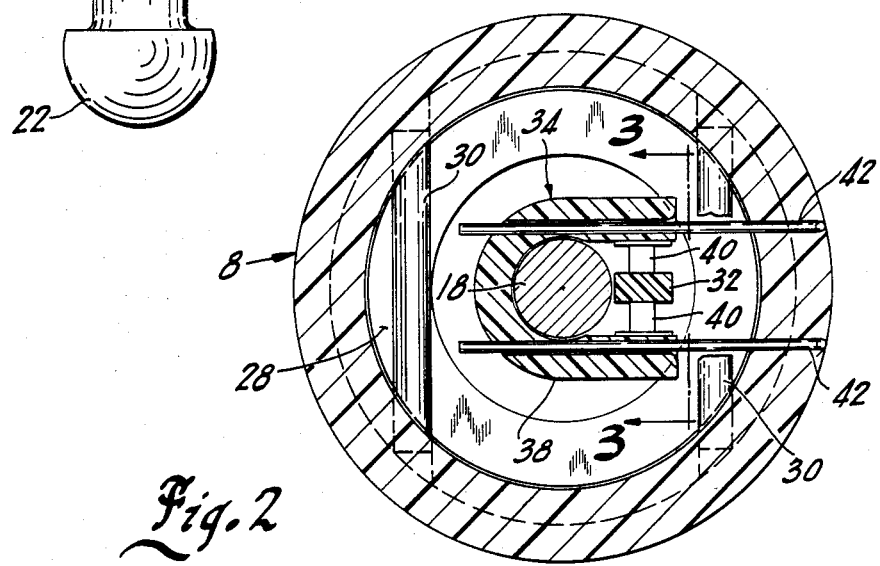
FIG. 2 is a cross-sectional view of FIG. 1 taken along the line 2—2 of FIG. 1.

As can be seen in FIGS. 2 and 3, resistive strip 32 is an elongate piece of a conductive material that is generally rectangular in cross-section. Strip 32 is secured to rod 18 by O-rings 36. Resistive strip 32 extends in a generally radial direction relative to rod 18. Resistive strip 32 is in constant electrical contact with wiper assembly 34. Wiper assembly 34 includes a housing 38 and wipers 40 and is secured within cylinder 8 by a pair of retaining pins 42. Housing 38 is generally U-shaped, and the inner circular face portion is designed to guide and hold rod 18, as seen in FIG. 2. Wipers 40 are attached to the inner, opposing planar faces of housing 38. From FIG. 3, it can be appreciated that the wipers 40 are maintained in tension contact with resistive strip 32.

Figure 4:
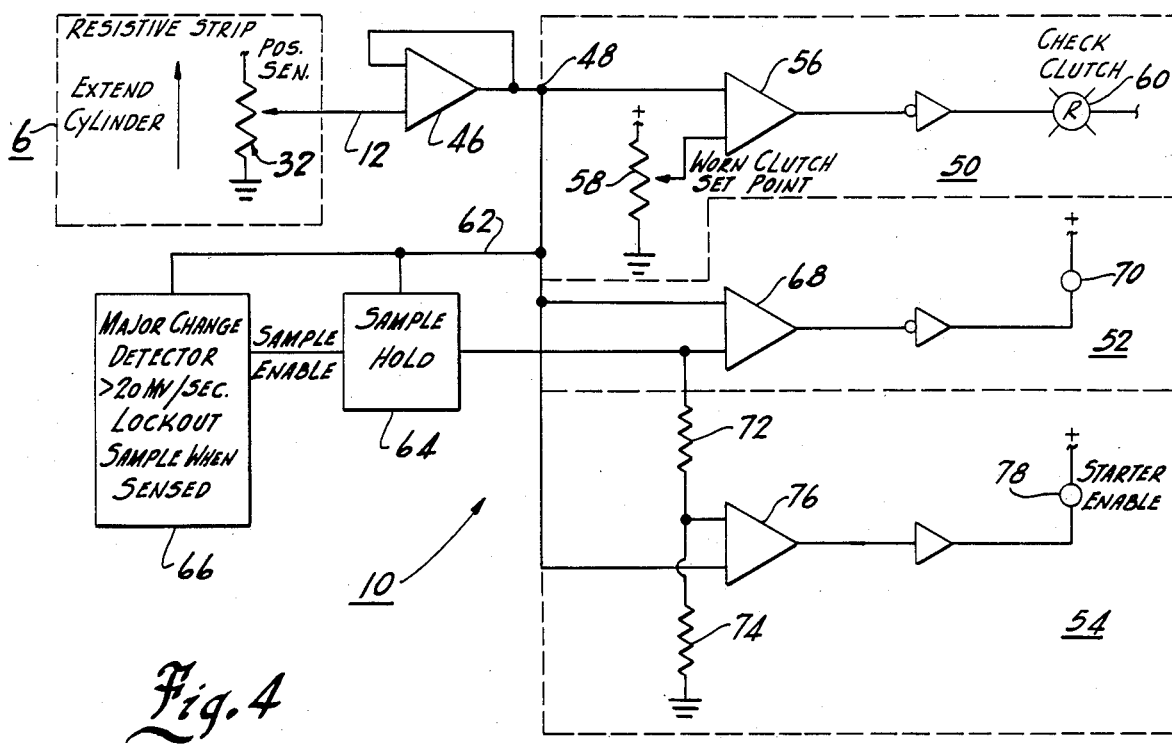
FIG. 4 is a schematic view of a signal interpreting circuit for use with the clutch sensor device shown in FIGS. 1—3.
Figure 8:
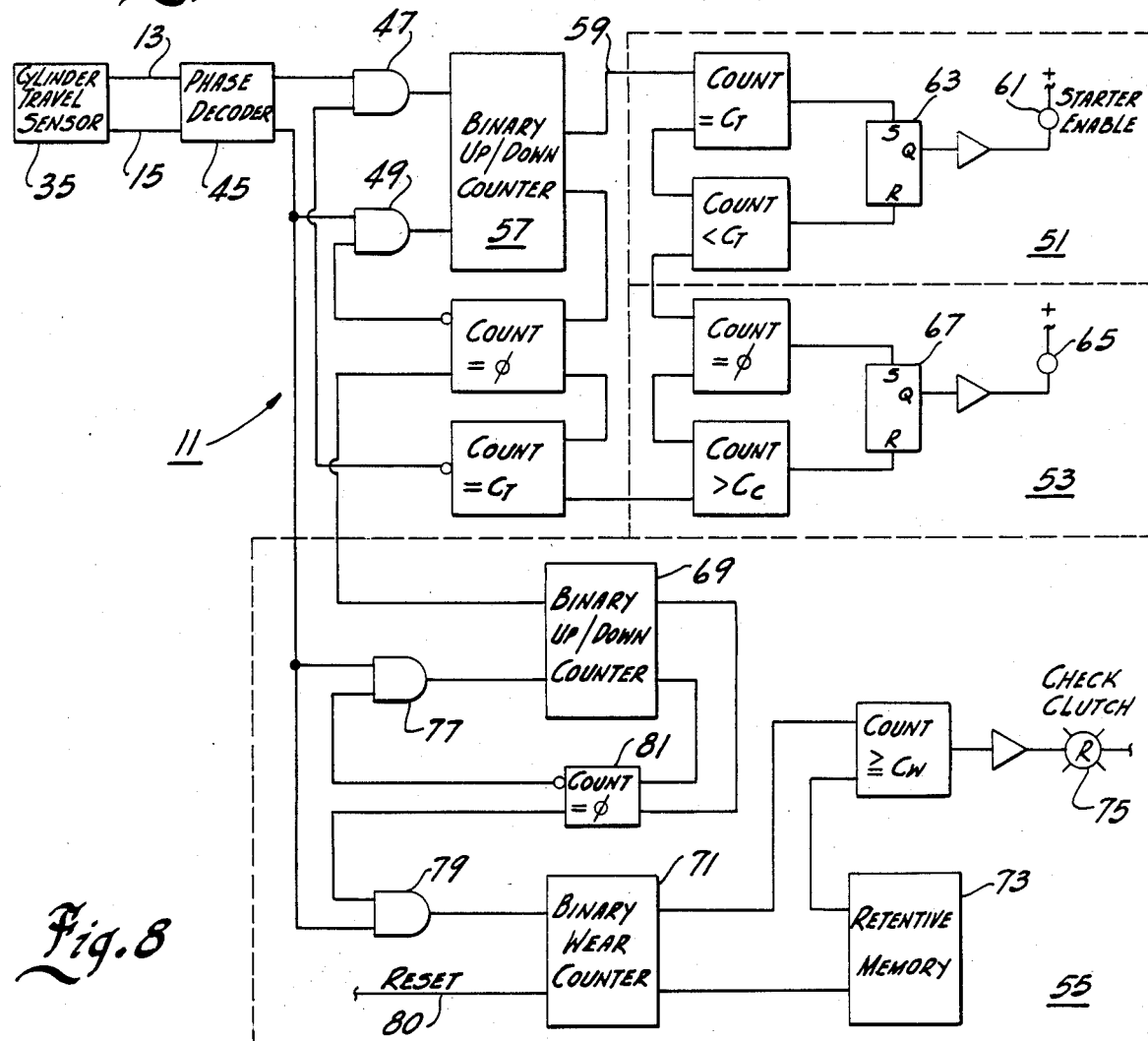
FIG. 8 is a schematic view of a signal interpreting logic circuit for use with the clutch sensor device shown in FIGS. 5-7.

The voltage signal generated is measured between wipers 40 and outer end 44 of resistive strip 32. The voltage signal is transmitted to control circuit 10 by lead 12. In circuit 10, the voltage signal from lead 12 is amplified in operational amplifier 46 becoming a control signal at point 48. The information this control signal carries can be utilized to monitor and control a number of functions within the vehicle. Such functions are shown schematically in subcircuits 50, 52, 54 in FIG. 4 and will be discussed in the following description of operation.

In operation, as stated above, when the clutch pedal is depressed, pressure will increase behind piston 24. Movement of piston 24 will force rod 18 outward. As rod 18 moves outward, the voltage measured across the resistive strip 32 between wipers 40 and strip end 44 will increase. Therefore, the control signal generated by op amp 46 at point 48 will correspondingly increase. The outer end 22 of rod 18 will extend outwardly from cylinder 8 and thereby release the clutch.

Examples of how the control signal generated at point 48 can be used will now be described. In circuit 50, the signal is fed to a voltage comparator 56 where it is compared with a voltage set point generated by variable resistor 58. If the control signal ever falls below the set point of variable resistor 58, then excessive clutch wear is detected since the rod 18 and piston 24 have retracted too far into cylinder 8. Voltage comparator 56 then turns on a dashboard light 60, a voice warning, etc., to warn the vehicle's operator that the clutch is dangerously worn.

The signal at 48 can also be used to automatically disengage one of the vehicle's systems using the circuitry 52 when the clutch is depressed far enough. Small signals will be generated just by resting one's foot against the clutch or by the usual bouncing and jarring the vehicle typically experiences. These signals will be transmitted by lead 62 to both a sample/hold generator 64 and to a major change detector 66. As long as the change in voltage is minor, a sample/hold generator 64 will be active and will send a sample signal to voltage comparator 68 at regular intervals, thus keeping the system operating. However, as soon as lead 62 introduces a signal that represents a significant change in piston position (i.e., caused by depressing the clutch pedal), the major change detector 66 locks out the sample/hold generator 64 and the existing signal is then maintained. Voltage comparator 68 will turn off the system enabler 70 if the voltage signal from 48 is large enough.

Likewise, in a specific example, the control signal from op amp 46 can be used to ensure that the clutch is sufficiently depressed during ignition by using the circuitry of 54. Once again, the signal must represent a major change in the position of the resistive strip 32 in a short period of time (e.g., 20 mv/sec.) to lock out the sample/hold generator 64. Resistors 72, 74 are then biased for voltage comparator 76. When a sufficient voltage change (i.e., change in position of the resistive strip) is detected, voltage comparator 76 will generate a signal to enable the starter 78.

Proceeding now to FIGS. 5-8, another preferred embodiment of the present invention is illustrated. As can be seen in FIG. 5, the piston position sensor system 7 again comprises a master cylinder and clutch pedal 2 connected to a slave cylinder 9 by conduit 4; slave cylinder 9 in turn being in electrical communication with logic control circuit 11 via leads 13, 15.

Slave cylinder 9 once again includes a generally cylindrical shell 14 with flange elements 16. Rod 17 enters cylinder 9 through rubber boot 19, outer end 22 being connected to the vehicle clutch (not shown). Cylinder 9 also includes piston 24 adjacent the inner end 26 of rod 17, piston 24 causing extension of rod 17 and release of the clutch when the clutch pedal is depressed. A washer 28, held in place by bolts 30, prevents overextension of piston 24.

This embodiment of the piston position sensor incorporates an optical encoder comprising optical fence 33 attached to rod 17 and optical interrupter 35 through which optical fence 33 and rod 17 pass. Optical interrupter 35 generates quadrature output as fence 33 moves through it, the output being transmitted via leads 13, 15 to circuit 11.

As can be seen in FIGS. 6 and 7, optical fence 33 is an elongate piece of transparent material that is generally rectangular in cross-section. Fence 33 comprises alternating transparent windows 29 and opaque lines 31 and is secured to rod 17 by O-rings 37. Optical fence 33 extends in a generally radial direction away from rod 17. Fence 33 is in constant optical communication with optical interrupter 35 in a manner to be described below.

Optical interrupter 35 includes a housing 39 and two LED/Photocell encoder arrays 41, 43 and is secured within cylinder 9 by retaining pins 27. Housing 39, as can be seen in FIG. 6, is generally U-shaped and has a circular inner face portion to guide and hold rod 17. Encoder arrays 41, 43 are encased within housing 39 and maintain two reference light beams between the inner, opposing planar faces of housing 39. Fence 33 passes between these faces, thus generating signals due to interruption of the reference beams. It can be appreciated from FIG. 7 that encoder array 41 has two opposing elements 41a, 41b. Likewise, array 43 comprises elements 43a, 43b.

Encoder arrays 41, 43 are arranged in such a way that the quadrature output transmitted to circuit 11 not only counts the number of opaque lines 31 that pass, but additionally determines whether rod 17 is extending or retracting. The quadrature output is transmitted by leads 13, 15 to a phase decoder 45 in circuit 11 which generates either an extend pulse or a retract pulse for each opaque line 31 encountered by optical interrupter 35. The information thus generated can be utilized to monitor and control a number of vehicle functions. Such functions are shown schematically in subcircuits 51, 53, 55 in FIG. 8 and will be discussed in the following description of operation.

Pulses generated as rod 17 extends are sent to AND gate 47 while pulses generated as rod 17 retracts are sent to AND gate 49. Whether the AND gates 47, 49 are enabled will depend on the existing count last generated by the binary up/down counter 57. The counter 57 counts strings of pulses up to a threshold number $C_T$, truncating all pulse strings at that number. The determination of the value of $C_T$ will be discussed below. The output of binary counter 57 is fed to other system components via pipeline 59. The extend/retract pulses of decoder 45 and the count values of binary counter 57 can be used to perform a number of functions relating to the vehicle's performance.

In circuit 51, the count value output of binary counter 57 is utilized to prevent ignition of the vehicle engine unless the clutch has been engaged. The starter 61 will remain disabled until the count value from pipeline 59 reaches $C_T$. $C_T$ represents the number of lines 31 that encoder arrays 41, 43 must count while fence 33 is being extended so that rod 17 can actuate the clutch. When the binary counter 57 reaches $C_T$, flip-flop 63 enables the engine starter 61.

In a similar manner, circuit 53 can shut off a vehicle system enabler 65. When the count value of binary counter 57 surpasses a different threshold pulse count $C_C$, the system enabler 65 is disabled. Minimal clutch depression is permitted, thus allowing the operator to rest his foot on the pedal, for example, without disengaging the relevant vehicle system. Allowance is thus also made for minimal bumping or jarring without disablement. Once $C_C$ is surpassed, due to whatever cause, flip-flop 67 disables the system enabler 65.

Wear can be checked in circuit 55 by another logic circuit. This circuit will utilize only the extend and retract pulses generated from the quadrature output of encoder arrays 41, 43. The binary up/down counter 69 is initially set at zero when a new clutch is installed, thus disabling AND gate 77. Each time the clutch pedal is depressed and subsequently released there is some wear that permits the piston 24 and rod 17 to retract further into cylinder 9 than the point at which they started. After enough wear the displacement becomes measurable and eventually means the clutch needs to be replaced.

In circuit 55, the second binary up/down counter 69 counts extend and retract pulses from the phase decoder 45. When the number of retract pulses is greater than the number of extend pulses in a given cycle, the binary wear counter 71 counts the excess. Retentive memory 73 stores the cumulative excess. When the total count value equals or exceeds $C_W$, the clutch wear is sufficient to require clutch replacement. The vehicle's operator then receives a dashboard light signal 75 or voice warning. The system auto references itself, thus zeroing after every extension, by using AND gates 77, 79 and count comparator 81. When a new clutch has been installed, the binary wear counter 71 is reset by using reset switch 80.

It should be obvious to one skilled in the art after reading the present specification that a wide variety of modifications can be made to the piston rod position sensor systems described above. For example, a linear variable displacement transducer could be employed to measure piston rod position. A magnetic element attached to the piston rod would move between inductive coils. Position change of the magnet would change the inductance of the coils. This change in inductance would in turn be interpreted and used by a control circuit similar to circuit 10 to control similar vehicle functions. Accordingly, the present invention is not to be limited by the description or illustration of certain specific disclosed embodiments but is to be limited solely by the scope of the claims which follow.

We claim:
1. In a hydraulic cylinder system, adaptable for releasing a vehicle clutch, which includes a hydraulic cylinder having a piston and a piston rod capable of being coupled to the vehicle clutch so as to be capable of moving said clutch, and wherein the position of said rod of said cylinder is dependent upon clutch wear and is indicative of the position of said clutch, the improvement including means for continuously detecting and measuring movement of said piston rod and means responsive to and communicating with said detecting and measuring means for controlling various vehicle functions dependent upon clutch position and clutch wear.

2. The invention set forth in claim 1 wherein said detecting and measuring means comprises a wiper assembly located within said cylinder and a slidable resistive strip coupled to said piston rod means and passing through said wiper assembly.

3. The invention set forth in claim 2 wherein said resistive strip is an elongate strip of conductive material, rectangular in cross-section, extending in a generally radial direction from said rod and is mounted to said piston rod means by O-ring means.

4. The invention set forth in claim 2 wherein said wiper assembly comprises a housing and wiper blades attached thereto, said wiper blades being in constant electrical contact with said slidable resistive strip.

5. The invention set forth in claim 2 wherein said slidable resistive strip and said wiper assembly generate an electrical output dependent upon travel and position of said clutch.

6. The invention set forth in claim 5 wherein said controlling means comprises an electrical circuit capable of interpreting said electrical output and enabling or disabling certain vehicle functions dependent upon clutch position and wear.

7. The invention set forth in claim 6 wherein one of said vehicle functions is a starter means of a vehicle, whereby a vehicle engine connected to said starter means may not be started until said clutch has been released.

8. The invention set forth in claim 6 wherein one of said vehicle functions controlled is a warning system to alert the vehicle operator to excessive clutch wear.

9. The invention set forth in claim 1 wherein said detecting and measuring means comprises an optical interrupter located within said cylinder and a slidable optical fence coupled to said piston rod means.

10. The invention set forth in claim 9 wherein said slidable optical fence is mounted to said piston rod means by O-ring means.

11. The invention set forth in claim 10 wherein said optical interrupter comprises a housing and encoder arrays encased therein, said encoder arrays being in constant optical communication with said slidable optical fence.

12. The invention set forth in claim 11 wherein said slidable optical fence and said optical interrupter generate an electrical output depdendent upon the travel and position of said clutch.

13. The invention set forth in claim 12 wherein said electrical output is quadrature output.

14. The invention set forth in claim 13 wherein said controlling means comprises an electrical circuit capable of interpreting said quadrature electrical output and enabling or disabling certain vehicle functions dependent upon clutch position and wear.

15. The invention set forth in claim 14 wherein one of said vehicle functions controlled is the vehicle starter means, whereby the vehicle engine may not be started until said clutch has been released.

16. The invention set forth in claim 14 wherein one of said vehicle functions controlled is a warning system to alert the vehicle operator to excessive clutch wear.

17. A piston rod position sensing system for controlling functions dependent upon clutch position and wear in a vehicle having a clutch pedal and a releasable clutch, comprising:

a hydraulic master-slave cylinder clutch system including a master cylinder coupled to the clutch pedal of said vehicle, said master cylinder additionally being hydraulically coupled to a slave cylinder, said slave cylinder including a piston;

rod means coupling said piston of said slave cylinder to the clutch of the vehicle so as to be capable of moving said clutch, and wherein the position of said rod means is dependent upon clutch wear and is indicative of the position of the clutch;

sensing means within said slave cylinder and coupled to said rod means to continuously detect and measure clutch position and wear;

control means connected to said sensing means and provided to interpret signals generated by said sensing means and to enable and disable certain vehicle functions dependent upon clutch position and wear.

18. The invention set forth in claim 17 wherein said sensing means comprises a resistive strip and wiper assembly.

19. The invention set forth in claim 17 wherein said sensing means comprises an optical fence and an optical interrupter.

20. A piston rod position sensing system for controlling functions dependent upon clutch position and wear in a vehicle having a clutch pedal and a releasable clutch, comprising:

a hydraulic master-slave cylinder clutch system including a master cylinder coupled to the clutch pedal of said vehicle, said master cylinder additionally being hydraulically coupled to a slave cylinder, said slave cylinder including a piston;

rod means coupling said piston of said slave cylinder to the clutch of the vehicle so as to be capable of moving said clutch, and wherein the position of said rod means is dependent upon clutch wear and is indicative of the position of the clutch;

sensing means within said slave cylinder and coupled to said rod means to continuously detect and measure clutch position and wear, said sensing means comprising elongate resistive strip means electrically coupled to wiper assembly means and designed to measure the resistance and changes thereof between said wiper assembly means and one end of said resistive strip means;

control means connected to said sensing means and signals generated by said sensing means and to enable and disable certain vehicle functions dependent upon clutch position and wear.

21. A piston rod position sensing system for controlling functions dependent upon clutch position and wear in a vehicle having a clutch pedal and a releasable clutch, comprising:

a hydraulic master-slave cylinder clutch system including a master cylinder coupled to the clutch pedal of said vehicle, said master cylinder additionally being hydraulically coupled to a slave cylinder, said slave cylinder including a piston;

rod means coupling said piston of said slave cylinder to the clutch of the vehicle so as to be capable of moving said clutch, and wherein the position of said rod means is dependent upon clutch wear and is indicative of the position of the clutch;

sensing means within said slave cylinder, and coupled to said rod means, to continuously detect and measure clutch position and wear, said sensing means comprising optical fence means, comprising alternating transparent windows and opaque lines, in optical communication with optical interrupter means, including a plurality of encoder arrays, said sensing means designed to generate quadrature output of extend and retract pulses due to movement of said rod means;

control means provided to interpret the quadrature output generated by said sensing means and to enable and disable certain vehicle functions dependent upon clutch position and wear.

* * * * *